United States Patent
Grant et al.

(10) Patent No.: US 8,147,211 B2
(45) Date of Patent: Apr. 3, 2012

(54) METHOD AND SYSTEM FOR MONITORING A RECIPROCATING COMPRESSOR VALVE

(75) Inventors: John W. Grant, Gardnerville, NV (US);
Olga Malakhova, Minden, NV (US);
Roger Hala, Gardnerville, NV (US);
Brian F. Howard, Issaquah, WA (US)

(73) Assignee: General Electric Company, Schenectady, NY (US)

( * ) Notice: Subject to any disclaimer, the term of this patent is extended or adjusted under 35 U.S.C. 154(b) by 486 days.

(21) Appl. No.: 11/324,668

(22) Filed: Jan. 3, 2006

(65) Prior Publication Data

US 2007/0154325 A1    Jul. 5, 2007

(51) Int. Cl.
*F04B 49/00* (2006.01)

(52) U.S. Cl. .......................................... 417/63; 417/53

(58) Field of Classification Search ............... 417/63, 417/53; 73/37, 40, 46, 47, 232, 239, 248, 73/253, 592, 861, 865.9; 137/1, 15.01, 15.08, 137/15.11; 702/1, 28, 29, 32, 33, 90; 706/45–47
See application file for complete search history.

(56) References Cited

U.S. PATENT DOCUMENTS

| | | | | |
|---|---|---|---|---|
| 4,456,963 A * | 6/1984 | Wiggins | 701/102 |
| 5,107,813 A * | 4/1992 | Inoue et al. | 123/406.22 |
| 5,112,196 A * | 5/1992 | Schuh | 417/63 |
| 5,471,400 A * | 11/1995 | Smalley et al. | 702/51 |
| 6,212,945 B1 * | 4/2001 | Moskwa | 73/117.3 |
| 6,260,004 B1 * | 7/2001 | Hays et al. | 702/183 |
| 6,292,757 B1 * | 9/2001 | Flanagan et al. | 702/138 |
| 6,485,265 B2 * | 11/2002 | Schroeder et al. | 417/63 |
| 6,666,093 B2 * | 12/2003 | Morganti | 73/587 |
| 6,883,775 B2 | 4/2005 | Coney et al. | |
| 6,937,941 B2 * | 8/2005 | Hala et al. | 702/33 |
| 7,056,097 B2 | 6/2006 | Lake | |
| 7,069,183 B2 * | 6/2006 | Schluecker et al. | 702/185 |
| 7,073,775 B2 | 7/2006 | Kabir et al. | |
| 7,117,080 B2 * | 10/2006 | Sobel | 701/114 |
| 7,124,057 B2 * | 10/2006 | Forster et al. | 702/183 |
| 7,130,751 B2 * | 10/2006 | Kyllingstad | 702/77 |
| 7,146,851 B2 * | 12/2006 | Wakahara et al. | 73/117.3 |
| 7,186,094 B2 * | 3/2007 | Edlund et al. | 417/63 |
| 7,318,350 B2 * | 1/2008 | Boken | 73/587 |
| 2001/0031203 A1 * | 10/2001 | Schroeder et al. | 417/63 |
| 2002/0023495 A1 * | 2/2002 | Morganti | 73/587 |
| 2004/0193384 A1 | 9/2004 | Edlund et al. | |
| 2004/0213677 A1 * | 10/2004 | Matzner et al. | 417/63 |
| 2005/0025631 A1 * | 2/2005 | Lake | 417/63 |
| 2005/0114044 A1 * | 5/2005 | Hala et al. | 702/33 |

\* cited by examiner

*Primary Examiner* — Devon C Kramer
*Assistant Examiner* — Amene Bayou
(74) *Attorney, Agent, or Firm* — Armstrong Teasdale LLP

(57) ABSTRACT

A method for monitoring a condition of at least one valve positioned with respect to at least one of a first chamber and a second chamber of a reciprocating compressor is provided. The method includes establishing a compressor operation cycle including a valve opening event, a valve closing event and/or a rod reversal event. A crank angle is determined at each of the valve opening event, the valve closing event and/or the rod reversal event during the compressor operation cycle using at least one of a static pressure input and a machine speed input. The method further include diagnosing a valve leak condition during the compressor operation cycle at the valve closing event, wherein the at least one valve is closed.

19 Claims, 6 Drawing Sheets

METHOD AND SYSTEM FOR MONITORING A RECIPROCATING COMPRESSOR VALVE

BACKGROUND OF THE INVENTION

This invention relates generally to monitoring the operation of machinery and, more particularly, to a method and system for monitoring a condition of a machine component.

Component failures including, without limitation, valve failures, are common in machinery, such as reciprocating compressors. For this reason, the ability to monitor component conditions is useful to personnel who operate and/or manage the machinery. This ability is particularly useful in machinery applications with fixed clearance volumes and no valve unloaders, where dynamic pressure measurements cannot be provided due to pressure transducer limitations, for example.

Conventionally, acceleration signals have been used in combination with cylinder PV patterns in monitoring a condition of a compressor component, such as a condition of a compressor valve. When no dynamic pressure is available, monitoring of compressor events and/or component condition becomes more challenging.

BRIEF DESCRIPTION OF THE INVENTION

In one aspect, the present invention provides a method for monitoring a condition of at least one valve positioned with respect to at least one of a first chamber and a second chamber of a reciprocating compressor. The method includes establishing a compressor operation cycle including a valve opening event, a valve closing event and/or a rod reversal event. A crank angle is determined at each the valve opening event, the valve closing event and/or the rod reversal event during the compressor operation cycle using a static pressure input and/or a machine speed input. A valve leak condition is diagnosed during the compressor operation cycle at the valve closing event wherein the at least one valve is closed.

In another aspect, the present invention provides a system for monitoring a condition of at least one valve positioned with respect to at least one of a first chamber and a second chamber of a reciprocating compressor. The system is configured to collect data by generating a crank angle degree variable and incrementally increasing the crank angle degree variable during each of a plurality of rule processing cycles to establish a compressor operation cycle. A pressure measured within the first chamber and a pressure measured within the second chamber during the compressor operation cycle is plotted as a function of crank angle. A gas load and an inertial load measured during the compressor operation cycle are plotted as a function of crank angle. An acceleration waveform sample is plotted and includes a cylinder acceleration during the compressor operation cycle as a function of crank angle. The system is further configured to diagnose a valve leak condition during the compressor operation cycle at a valve closing event wherein the at least one compressor valve is closed and diagnose a restricted flow condition during the compressor operation cycle at a valve opening event wherein the at least one compressor valve is open.

In another aspect, the present invention provides a computer program for monitoring a valve condition. The computer program is configured to determine a crank angle at each of a valve opening event, a valve closing event and a rod reversal event using at least one of a static pressure input and a machine speed input. The computer program is further configured to diagnose a valve leak condition during a compressor operation cycle at the valve closing event and a restricted flow condition during the compressor operation cycle at the valve opening event.

DETAILED DESCRIPTION OF THE INVENTION

In one embodiment, the present invention provides a method and system for monitoring a condition of at least one compressor component, such as a valve. The method includes determining a crank angle at least one valve opening event, valve closing event and/or rod reversal event based on a static pressure input and/or a machine speed input. Utilizing the knowledge of the crank angle during a compressor operation cycle, a valve leak condition and/or a restricted flow condition during the compressor operation cycle can be diagnosed.

The present invention is described below in reference to its application in connection with and operation of a reciprocating compressor including a first or head end (HE) chamber and an opposing second or crank end (CE) chamber. A suction valve and a discharge valve are independently operatively coupled with respect to the HE chamber. Similarly, a suction valve and a discharge valve are independently operatively coupled with respect to the CE chamber. It is obvious to those skilled in the art and guided by the teachings herein provided that the invention is likewise applicable to any suitable machine and/or machine component having any suitable number of pistons, chambers and/or valves, for example.

Figure 1:
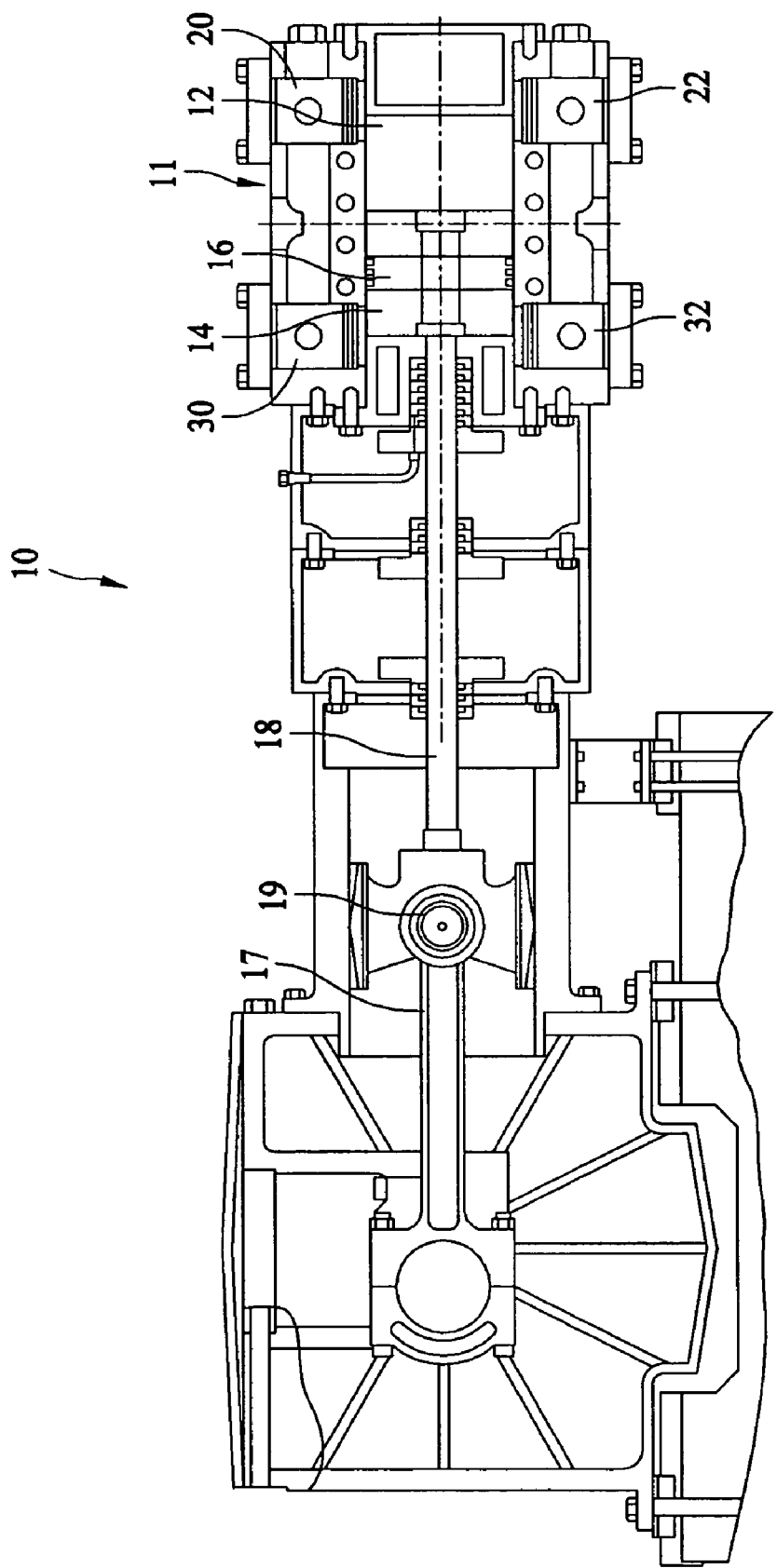
FIG. 1 is a partial schematic view of an exemplary reciprocating compressor.

In one embodiment, a reciprocating compressor 10 includes a cylinder 11 defining a first or head end (HE) chamber 12 and an opposing second or crank end (CE) chamber 14, as shown in FIG. 1. A piston head 16 is positioned within cylinder 11 and movable within cylinder 11 in a reciprocating motion. A piston rod 18 operatively couples the linear motion of piston head 16 to a rotating shaft of compressor 10 through crosshead pin 19 and connecting rod 17. A HE suction valve 20 is operatively coupled with respect to HE chamber 12. Suction valve 20 opens to allow a gas or gas mixture to enter HE chamber 12 as piston head 16 moves outwardly with respect to HE chamber 12 during a suction stroke to draw the gas or gas mixture into HE chamber 12. A HE discharge valve 22 is also operatively coupled with respect to HE chamber 12. Discharge valve 22 opens to allow a compressed gas or gas mixture to exit HE chamber 12 as piston head 16 moves inwardly with respect to HE chamber 12 during a compression stroke to force or direct the compressed gas or gas mixture out of HE chamber 12. Similarly, a CE suction valve 30 is operatively coupled with respect to CE chamber 14. Suction valve 30 opens to allow the gas or gas mixture to enter CE chamber 14 as piston head 16 moves outwardly with respect to CE chamber 14 to draw the gas or gas mixture into CE chamber 14. A CE discharge valve 32 is also operatively coupled with respect to CE chamber 14. Discharge valve 32 opens to allow a compressed gas or gas mixture to exit CE chamber 14 as piston head 16 moves inwardly with respect to CE chamber 14 to force or direct the compressed gas or gas mixture out of CE chamber 14.

Figure 2:
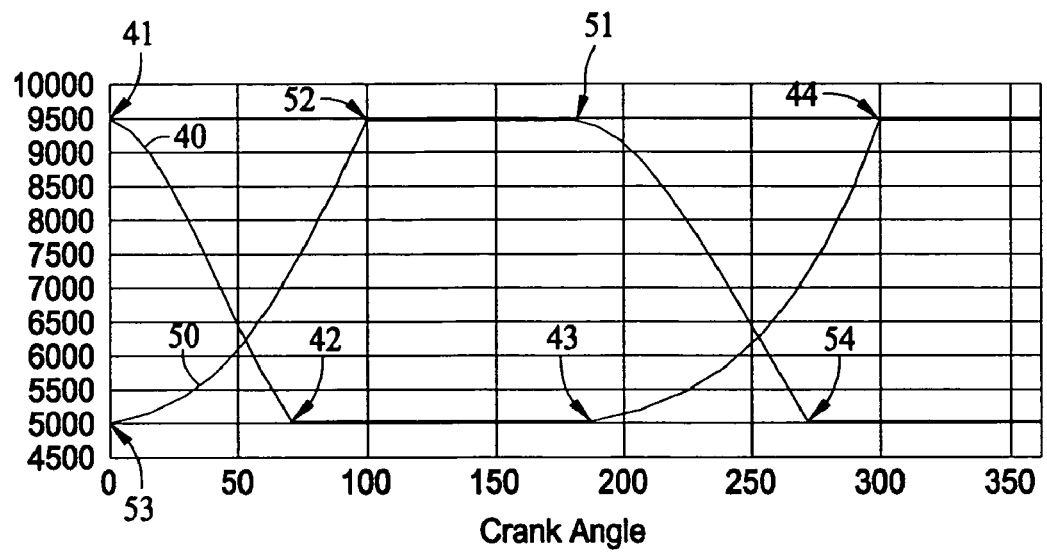
FIG. 2 is a graphical representation of pressure verses crank angle within each of a head end chamber and a crank end chamber of the reciprocating compressor shown in FIG. 1.

Referring to FIG. 2, in one embodiment, at least one valve opening event and/or at least one valve closing event is determined to establish a timing of a compressor operation cycle. A complete compressor operation cycle includes a full rotation between a crank angle of 0 degrees and 360 degrees. As shown in FIG. 2, a pressure curve 40 representing a pressure within HE chamber 12 measured in pounds per square inch (psi) is plotted as a function of the crank angle. HE suction valve 20 opens with the crank angle at about 70 degrees, as indicated by reference number 42, and HE discharge valve 22 opens with the crank angle at about 300 degrees, as indicated by reference number 44. HE suction valve 20 closes with the crank angle at about 180 degrees, as indicated by reference number 43, and HE discharge valve 22 closes with the crank angle at about 0 degrees as indicated by reference number 41. Similarly, a pressure curve 50 representing a pressure within CE chamber 14 measured in psi is plotted as a function of the crank angle. CE discharge valve 32 opens with the crank angle at about 98 degrees, as indicated by reference number 52, and CE suction valve 30 opens with the crank angle at about 270 degrees, as indicated by reference number 54. CE suction valve 30 closes with the crank angle at about 0 degrees, as indicated by reference number 53, and CE discharge valve 32 closes with the crank angle at about 180 degrees as indicated by reference number 51.

Figure 3:
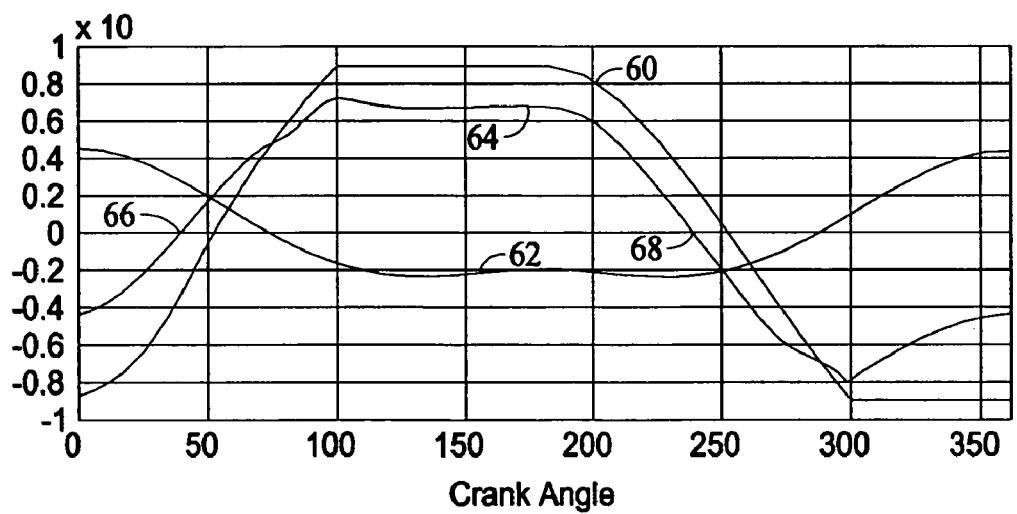
FIG. 3 is a graphical representation of load versus crank angle for each of a gas load, an inertial load and a combined load within the head chamber of the reciprocating compressor shown in FIG. 1.

Additionally, a gas load, an inertial load and/or a combined load as a function of crank angle during one compressor operation cycle is plotted for each of HE chamber 12 and CE chamber 14. As shown in FIG. 3, the gas load, the inertial load and the combined load within HE chamber 12 are plotted as a function of the crank angle. A similar curve for the gas load, inertial load and the combined load within CE chamber 14 can be plotted. As used herein, references to "gas load" are to be understood to refer to a force of the gas acting against piston head 16 during the combustion process within the cylinder expressed as a total force across a surface area of the piston (lbf). As used herein, references to "inertial load" are to be understood to refer to the force required to move a mass of the linear moving piston assembly, including the piston components and associated mechanical components, expressed as a total combined force (lbf). The "combined load" is a summation of the gas loads and the inertial loads.

Referring to FIG. 3, in one embodiment, at least one rod reversal event is determined to further establish a timing of the compressor operation cycle. As shown in FIG. 3, a gas load curve 60 representing a load exerted on piston head 16 is plotted as a function of the crank angle. Similarly, an inertial load curve 62 representing the inertial load exerted on crosshead pin 19 is plotted as a function of the crank angle. A combined load curve 64 representing the summation of the gas loads and the inertial loads exerted on crosshead pin 19 is also plotted as a function of crank angle. As shown in FIG. 3, a first rod reversal event corresponds to a point during the compressor operation cycle where the combined load on crosshead pin 19 is zero and occurs with the crank angle at about 40 degrees, as indicated by reference number 66. At the first rod reversal event, the crank and the associated piston assembly force transfers from a tensile force to a compressive force and is referred to as top dead center (TDC). A second rod reversal event corresponds to a point during the compressor operation cycle where the combined load on the piston is zero and occurs with the crank angle at about 240 degrees, as indicated by reference number 68. At the second rod reversal event, the crank and the associated piston assembly transfers from the compressive force to the tensile force.

Figure 4:
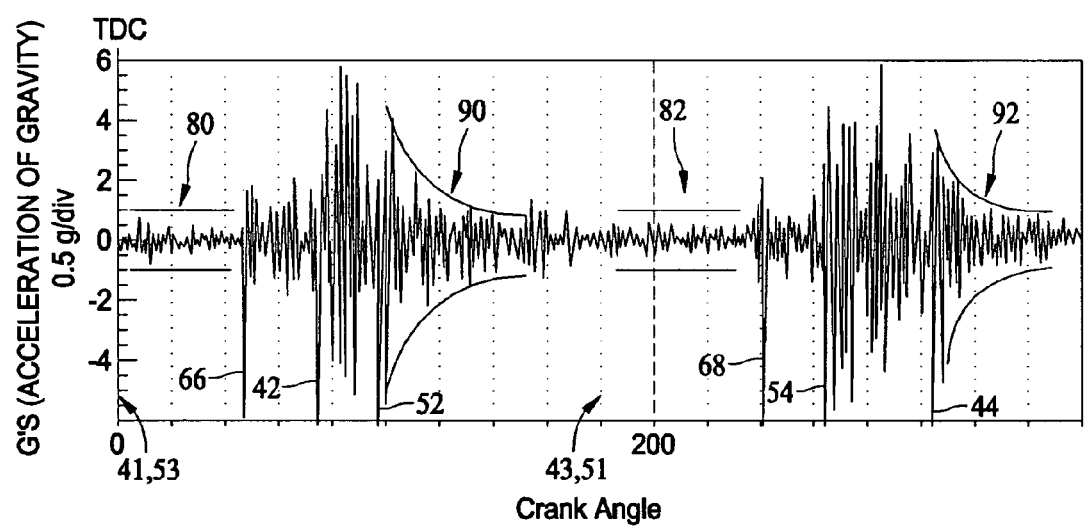
FIG. 4 is a graphical representation of cylinder acceleration verses crank angle for the reciprocating compressor shown in FIG. 1.

FIG. 4 graphically represents an acceleration waveform sample from a cylinder location. The acceleration waveform sample graphically represents a cylinder acceleration measured in acceleration of gravity (G's) as a function of crank angle. Acceleration peaks are found within 5 degrees from the theoretically predicted compressor events, which is acceptable for the valve diagnostic steps discussed below. Referring to FIG. 4, HE discharge closing 41 and CE suction closing 53 occur at 0 degrees, first rod reversal event 66 occurs with the crank angle at about 40 degrees, HE suction valve opening event 42 occurs with the crank angle at about 65 degrees, CE discharge valve opening event 52 occurs with the crank angle at about 98 degrees, HE suction closing 43 and CE discharge closing 51 occur at 180 degrees, second rod reversal event 68 occurs with the crank angle at about 240 degrees, CE suction valve opening event 54 occurs with the crank angle at about 270 degrees, and HE discharge valve opening event 44 occurs with the crank angle at about 300 degrees.

Figure 5:
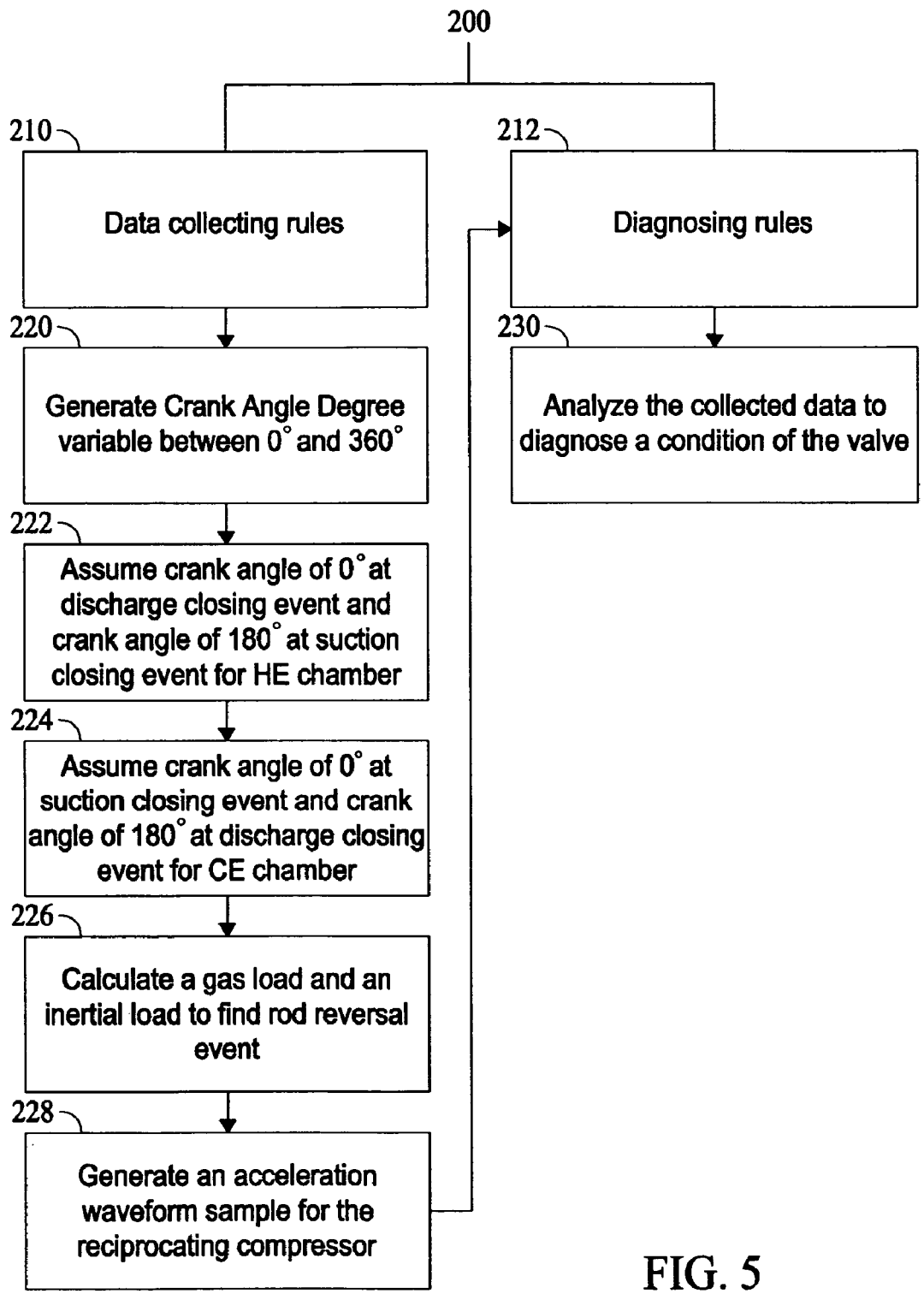
FIG. 5 is a block diagram of a method for monitoring a condition of a compressor valve.

In one embodiment, a method and system for monitoring a condition of a compressor valve is provided. The method includes establishing a compressor operation cycle at each of at least one valve opening event, valve closing event and/or rod reversal event. FIG. 5 is an exemplary rule set 200 that is configured to receive data from a component, such as a valve of reciprocating compressor 10, to establish the compressor operation cycle and analyze the received data to diagnose a component condition.

In one embodiment, rule set 200 includes a plurality of rules that are responsive to rule set 200. Referring further to FIG. 5, in this embodiment, rule set 200 includes at least data collecting rules 210 and diagnosing rules 212. Data collecting rules 210 are designed to simulate a cylinder pressure behavior by generating a Crank Angle Degree (CAD) variable 220 that is incrementally increased during each rule processing cycle. In a particular embodiment, CAD variable 220 is increased by 0.5° at each rule processing cycle within a range of 0° to 359.5°, wherein 0° corresponds to a top dead center (TDC) position of piston head 16. Data collecting rules 210 are utilized to organize a crank angle cycle, as shown in FIGS. 2-4, in order to determine valve opening events and/or valve closing events. In this embodiment, the acceleration waveform is sampled at a 720× rate. Further, with the crank angle cycle organized, loads exerted on piston head 16 during the expansion stroke and/or compression stroke are calculated.

Referring to FIGS. 2 and 5, in one embodiment, upon generating CAD variable 220, at least one valve opening crank angle and a corresponding cylinder pressure are estimated using a static suction input and/or a discharge pressure input. An assumption rule 222 assumes a crank angle of 0° at a discharge closing event and a crank angle of 180° at a suction closing event for HE chamber 12. Rule 222 is designed to calculate the valve opening angles for the static suction and the discharge pressure, as well as the theoretical pressure within HE chamber 12. Each rule cycle produces one value that corresponds with a current crank angle that increases 0.5 degrees per rule cycle. In this embodiment, rule 222 calculates the crank angle degree at which HE suction valve 20 opens and the crank angle degree at which HE discharge valve 22 opens based on a "r to L" ratio, a compression ratio, a "HE Kave" and/or a clearance volume within HE chamber 12. A "r to L" ratio is the ratio of crankshaft radius (½ stroke length), r, to connecting rod length, L. A compression ratio is a ratio of a discharge pressure to a suction pressure in absolute pressures. A HE Kave is an average isentropic exponent representing an average compressibility of a gas. Clearance volume is a volume remaining in a chamber when a piston assembly is fully extended (sometimes expressed as a percentage of a swept volume). Rule 222 also calculates the theoretical pressure within HE chamber 12. An additional assumption rule 224 assumes a crank angle of 0° at a suction closing event and a crank angle of 180° at a discharge closing event for CE chamber 14. Rule 224 is similarly designed to calculate the valve opening angles for the static suction and the discharge pressure, as well as the theoretical pressure within CE chamber 14. In this embodiment, rules 224 calculate the crank angle degree at which CE suction valve 30 opens and the crank angle degree at which CE discharge valve 32 opens based on a r to L ratio, a pressure ratio, a CE Kave and/or a clearance volume within CE chamber 14.

Referring to FIGS. 3 and 5, in one embodiment, upon generating CAD variable 220 and theoretical pressures, a group of rules 226 calculate a gas load and/or an inertial load are calculated in order to find at least one rod reversal point. As shown in FIG. 3, a rod reversal event corresponds to each point on combined load curve 64 having a value of zero. As described above, a first rod reversal event indicates a point during the compressor operation cycle where the combined load on crosshead pin 19 is zero and occurs with the crank angle at about 40 degrees, as indicated by reference number 66. A second rod reversal event indicates a point during the compressor operation cycle where the combined load on crosshead pin 19 is zero and occurs with the crank angle at about 240 degrees, as indicated by reference number 68.

From the data collected utilizing data collecting rules 210, an acceleration waveform sample for reciprocating compressor 10 is generated 228. The acceleration waveform sample represents acceleration measured on cylinder 10 as a function of crank angle during at least one valve opening event, at least one valve closing event and/or at least one rod reversal event. Diagnosing rules 212 are utilized to analyze 230 the collected data and diagnose a condition of a reciprocating compressor valve. In one embodiment, if a machine speed, a suction pressure and a discharge pressure are within design variation limits for at least twelve minutes, a valve leak condition and/or a restricted flow condition diagnosis is performed. The valve leak condition and/or the restricted flow condition diagnosis is performed on HE suction valve 20, HE discharge valve 22, CE suction valve 30 and/or CE discharge valve 32. This check is performed to ensure process consistency so that an error from a possible discrepancy between an actual cylinder pressure and a corresponding theoretically approximated cylinder pressure is relatively small. FIGS. 2 and 3 illustrate theoretical plots of pressure versus crank angle and load versus crank angle, respectively. FIG. 4 illustrates a corresponding reciprocating compressor plot. Specifically, FIG. 4 is a plot of cylinder acceleration versus crank angle for a synchronous acceleration waveform sample from a compressor cylinder location. As shown in FIG. 4, acceleration peaks are found within 5 degrees from theoretically predicted compressor events, which is acceptable for the valve diagnostics described below.

Figure 6:
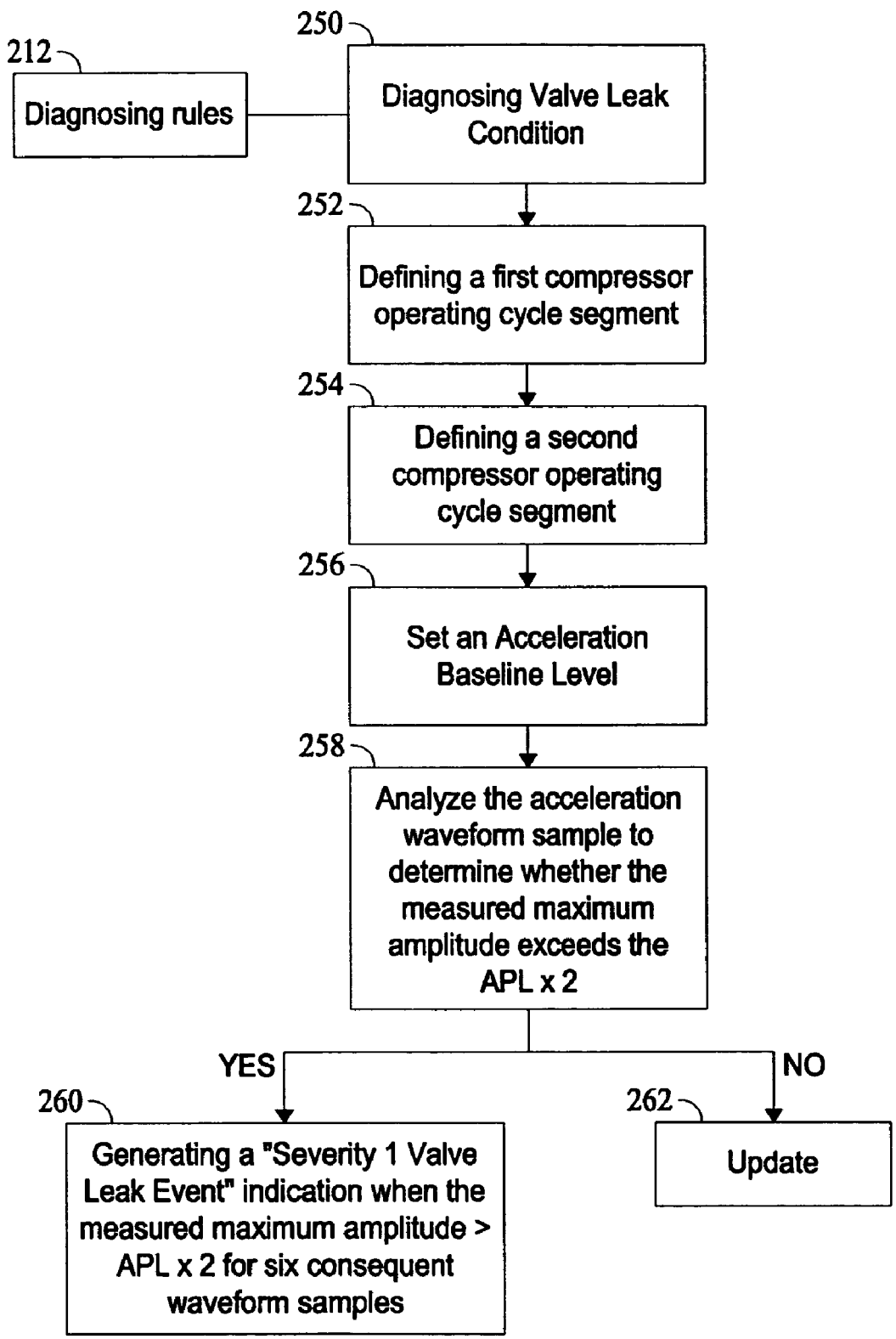
FIG. 6 is a block diagram of a method for diagnosing a valve leak condition.

Referring to FIG. 6, in one embodiment, the method for monitoring a condition of a compressor valve includes diagnosing 250 a valve leak condition. A leaking valve will generate a vibration during a portion of the compressor operation cycle, such as at the valve closing event if the valve does not close properly. In one embodiment, a sensor, such as an acceleration probe, is positioned with respect to the cylinder valve to sense or detect the vibration. As a result of the leaking valve and the detection of the vibration, the acceleration waveform, such as shown in FIG. 4, will demonstrate an increased level during the valve closing event. An amount increase that is considered above normal is specific for the machine and probe location.

In one embodiment, a double-acting single cylinder is utilized in reciprocating compressor 10. For a double-acting single cylinder, all four valves (HE suction valve 20, HE discharge valve 22, CE suction valve 30 and CE discharge valve 32) should be closed during each of a first crank angle segment, as indicated by reference number 80 in FIG. 4, and a second crank angle segment, as indicated by reference number 82 in FIG. 4. First crank angle segment 80 represents a time period between when a last of CE suction valve 30 or HE discharge valve 22 is closed and the earliest of a rod reversal event in the range from 0° to 179.5°, a HE suction valve opening event and a CE discharge valve opening event. Second crank angle segment 82 represents a time period between when a last of HE suction valve 20 or CE discharge valve 32 is closed and the earliest of a rod reversal event in the range from 180° to 359.5°, a HE suction valve opening event and a CE discharge valve opening event. FIG. 4 illustrates an acceleration waveform for valves in proper operating condition. For crank angle segments 80 and 82, the acceleration level is below 1 g. In this particular embodiment, 1 g is considered as an Acceleration Baseline Level (ABL). The ABL is set when all valves are closed and the machine is operating correctly.

Referring further to FIG. 6, a valve leak diagnosis 250 includes analyzing the acceleration waveform, such as shown in FIG. 4, to determine a maximum amplitude value from segments 80 and 82. A first group of rules 252 is designed to define first segment 80 for valve leak detection, and a second group of rules 254 is designed to define second segment 82 for valve leak detection. When the valves are in good operating condition, the transient processes associated with valve closure do not last longer than about 3 degrees of crank angle. Therefore, the first segment start angle has a default of 3 degrees and the second segment start angle has a default of 183 degrees. The ABL is set 256. In one particular embodiment, a custom operation step in the second rule group finds a minimum value and a maximum value for a segment of a synchronous waveform. In this embodiment, an "Error Degrees" input in first rule group 252 accounts for inaccuracy derived from using static pressure data by narrowing the crank angle segments used in the second rule custom operation step. The acceleration waveform sample is analyzed 258 to determine whether a measured amplitude exceeds the maximum amplitude value. In one embodiment, if the measured maximum amplitude exceeds ABL×2 for at least six consequent waveforms, a "Severity 1 Valve Leak Event" indication is generated 260.

Figure 7:
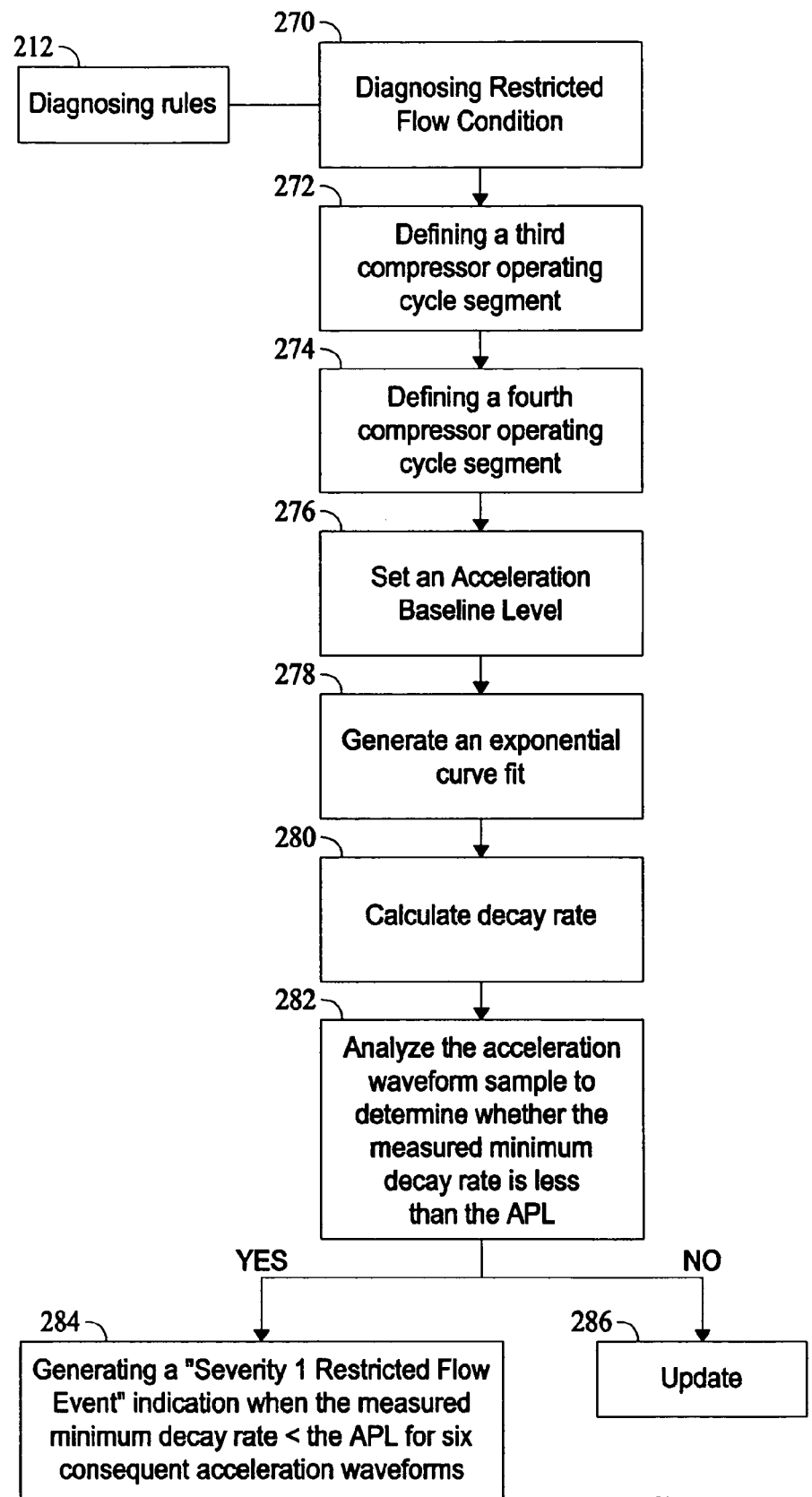
FIG. 7 is a block diagram of a method for diagnosing a restricted flow condition.

Referring further to FIG. 7, in one embodiment, the method for monitoring a condition of a compressor valve includes diagnosing 270 a restricted flow condition. After a valve has been fully opened, gas flow through the valve will diminish as a piston velocity decreases. Consequently, when the valve operates properly, an acceleration amplitude will gradually decrease beginning at the valve opening event. Normal valve behavior can be characterized by an attenuation rate, which is specific to the machine and gas process parameters. A fault condition, such as a sticky valve or a spring that is too heavy, may result in an inability for the valve to fully open. Thus, the flow through the valve is restricted and a pattern of the acceleration waveform, such as shown in FIG. 4, is changed.

In one embodiment, diagnosing rules 212 are utilized to analyze the data and perform restricted flow diagnosis 270. For example, in this embodiment, reciprocating compressor 10 includes is a double-acting cylinder, having discharge and suction valve opening events that are close to each other. Therefore, eight maximum acceleration values are obtained for corresponding eight 5-degree consequent crank angle intervals beginning with the last discharge valve opening event. As shown in FIG. 4, a third compressor operating cycle segment 90 is defined 272 to represent a 40 degree compressor operating cycle segment beginning when CE discharge valve 32 opens. A fourth compressor operating cycle segment 92 is defined 274 to represent a 40 degree crank angle segment beginning when HE discharge valve 22 opens. The ABL is set 276. An exponential curve fit is generated 278 with the eight maximum acceleration values and its decay rate is calculated 280.

Referring to FIGS. 4 and 7, the acceleration signal decays after each discharge valve opening event approximately four times per each forty degrees of crank angle. The curve fit procedure is performed independently for third compressor operating cycle segment 90 and fourth compressor operating cycle segment 92. The curve fit is analyzed to determine whether a minimum decay rate value is less than a configured value 282. If a minimum decay rate value from the two decay rates is less than a configured value, specific to the machine configuration, for six consequent acceleration waveforms, a "Severity 1 Restricted Flow Event" indication is generated 284. If the minimum from the two decay rates is greater than the configured value, the compressor operation cycle is updated and repeated 286. FIG. 4 illustrates an exponential fit for third compressor operating cycle segment 90 (HE suction valve and CE discharge valve opening events), and an exponential fit for fourth compressor operating cycle segment 92 (CE suction valve and HE discharge valve opening events).

In one embodiment, a computer program is configured for monitoring a valve condition. In a particular embodiment, the computer program is embodied on a computer readable medium for monitoring a condition of at least one valve positioned with respect the first chamber and the second chamber of the reciprocating compressor. The computer program includes a code segment that is configured to calculate a crank angle at a valve opening event, a valve closing event and/or a rod reversal event using a static pressure input and/or a machine speed input. The computer program is further configured to diagnose a valve leak based upon acceleration waveform analysis of a compressor operation cycle at the valve closing event. Further, the computer program is configured to diagnose a restricted flow based on acceleration waveform analysis at the valve opening event.

While the invention has been described in terms of various specific embodiments, those skilled in the art will recognize that the invention can be practiced with modification within the spirit and scope of the claims.

What is claimed is:

1. A method for monitoring a condition of at least one valve positioned with respect to at least one of a first chamber and a second chamber of a reciprocating compressor, said method comprising:

establishing a compressor operation cycle including at least one of a valve opening event, a valve closing event and a rod reversal event;

generating a crank angle degree variable at each 0.5° increment for each of a plurality of rule processing cycles within a range of 0° to 359.5°;

simulating a cylinder pressure for at least one of the first chamber and the second chamber for each of the generated crank angle degree variables;

estimating a crank angle and a corresponding cylinder pressure for at least one valve opening event during the compressor operation cycle using at least one of a static suction input and discharge pressure input;

determining the crank angle and the corresponding cylinder pressure for at least one valve closing event during the compressor operation cycle using the generated crank angle degree variables;

determining at least one rod reversal event during the compressor operation cycle using at least one of the simulated cylinder pressure, the estimated valve opening event cylinder pressure, and the determined valve closing event cylinder pressure, wherein the at least one rod reversal event includes at least a first rod reversal event that occurs with the crank angle at about 40 degrees and at least a second rod reversal event;

analyzing an acceleration waveform sample to establish a first compressor operation cycle segment during the at least one valve closing event, and a second compressor operation cycle segment during the at least one valve closing event;

setting an acceleration baseline level for each of the first compressor operation cycle segment and the second compressor operation cycle segment using the simulated cylinder pressure;

determining a maximum value and a minimum value of the acceleration waveform sample for each of the first compressor operation cycle segment and the second compressor operation cycle segment; and diagnosing a valve leak condition during the compressor operation cycle at the valve closing event wherein the at least one valve is closed by comparing the maximum and minimum values of the acceleration waveform sample against the acceleration baseline level.

2. A method in accordance with claim 1 further comprising diagnosing a restricted flow condition during the compressor operation cycle at the valve opening event wherein the at least one valve is open.

3. A method in accordance with claim 1 wherein establishing a compressor operation cycle further comprises plotting a pressure within at least one of the first chamber and the second chamber during the compressor operation cycle as a function of the crank angle.

4. A method in accordance with claim 1 wherein establishing a compressor operation cycle further comprises plotting at least one of a gas load, an inertial load and a combined load measured within at least one of the first chamber and the second chamber during the compressor operation cycle as a function of the crank angle.

5. A method in accordance with claim 4 wherein determining a crank angle further comprises calculating the combined load including the gas load and the inertial load.

6. A method in accordance with claim 1 wherein establishing a compressor operation cycle further comprises plotting a cylinder acceleration during the compressor operation cycle as a function of the crank angle.

7. A method in accordance with claim 1 wherein diagnosing a valve leak condition further comprises diagnosing the valve leak condition with each of a machine speed, a suction pressure and a discharge pressure within a design variation limit for at least twelve minutes.

8. A method in accordance with claim 1 wherein diagnosing a valve leak condition further comprises detecting a vibration during the valve closing event.

9. A method in accordance with claim 8 further comprising:
generating a "Severity 1 Valve Leak Event" indication when a maximum acceleration amplitude for one of the first compressor operation cycle segment and the second compressor operation cycle segment exceeds the acceleration baseline level×2 for at least six consequent acceleration waveform samples.

10. A method in accordance with claim 2 wherein diagnosing a restricted flow condition further comprises diagnosing the restricted flow condition with each of a machine speed, a suction pressure and a discharge pressure within a design variation limit for at least twelve minutes.

11. A method in accordance with claim 2 wherein diagnosing a restricted flow condition further comprises:
obtaining eight maximum acceleration values for eight corresponding consequent crank angle intervals of 5° during the first compressor operation cycle segment and obtaining eight maximum acceleration values for eight corresponding consequent crank angle intervals of 5° during the second compressor operation cycle segment;
generating an exponential curve fit with the eight maximum acceleration values for each of the first compressor operation cycle segment and the second compressor operation cycle segment;
calculating a decay rate for each of the first compressor operation cycle segment and the second compressor operation cycle segment; and
generating a "Severity 1 Restricted Flow Event" indication with a minimum amplitude value from at least one of the decay rates less than the acceleration baseline level for six consequent acceleration waveform samples.

12. A system for monitoring a condition of at least one valve positioned with respect to at least one of a first chamber and a second chamber of a reciprocating compressor, said system configured to:
collect data by generating a crank angle degree variable and incrementally increasing the crank angle degree variable by a 0.5° increment from 0° to 359.5° during each of a plurality of rule processing cycles to establish a compressor operation cycle;
plot a pressure measured within the first chamber and a pressure measured within the second chamber during the compressor operation cycle as a function of a crank angle;
plot a gas load and an inertial load measured within at least one of the first chamber and the second chamber during the compressor operation cycle as a function of the crank angle;
plot a combined load comprising the summation of the measured gas load and the measured inertial load;
plot an acceleration waveform sample including a cylinder acceleration during the compressor operation cycle as a function of the crank angle;
analyze the combined load to determine at least one rod reversal event that includes at least a first rod reversal event that occurs with the crank angle at about 40 degrees and at least a second rod reversal event;
analyze the acceleration waveform sample to establish a first compressor operation cycle segment wherein the at least one valve is closed and a second compressor operation cycle segment wherein the at least one valve is closed;
set an acceleration baseline level for each of the first compressor operation cycle segment and the second compressor operation cycle segment from the pressure measured during the compressor operation cycle;
determine a maximum value and a minimum value of the acceleration waveform sample for each of the first compressor operation cycle segment and the second compressor operation cycle segment; and
diagnose a valve leak condition during the compressor operation cycle at a valve closing event wherein the at least one compressor valve is closed by comparing the maximum and minimum values of the acceleration waveform sample against the acceleration baseline level; and
diagnose a restricted flow condition during the compressor operation cycle at a valve opening event wherein the at least one compressor valve is open.

13. A system in accordance with claim 12 further configured to:
generate a "Severity 1 Valve Leak Event" indication when a maximum acceleration amplitude for at least one of the first compressor operation cycle segment and the second compressor operation cycle segment exceeds the acceleration baseline level×2 for at least six consequent acceleration waveform samples.

14. A system in accordance with claim 12 further configured to:
obtain eight maximum acceleration values for eight corresponding consequent crank angle intervals of 5° during the first compressor operation cycle segment and obtain eight maximum acceleration values for eight corresponding consequent crank angle intervals of 5° during the second compressor operation cycle segment;
generate an exponential curve fit with the eight maximum acceleration values for each of the first compressor operation cycle segment and the second compressor operation cycle segment;
calculate a decay rate for each of the first compressor operation cycle segment and the second compressor operation cycle segment; and
generate a "Severity 1Restricted Flow Event" indication with a minimum amplitude value for at least one of the decay rates less than the acceleration baseline level for six consequent acceleration waveform samples.

15. A computer program embodied on a computer readable medium for monitoring a condition of at least one valve positioned with respect to at least one of a first chamber and a second chamber of a reciprocating compressor, said computer program comprising a code segment configured to:
generate a crank angle degree variable at each 0.5° increment for each of a plurality of rule processing cycles within a range of 0° to 359.5°;
simulate a cylinder pressure for at least one of the first chamber and the second chamber for each of the generated crank angle degree variables;
estimate a crank angle and a corresponding cylinder pressure at a valve opening event using at least one of a static suction input and a discharge pressure input;
determine the crank angle and the corresponding cylinder pressure for at least one valve closing event during a compressor operation cycle using the generated crank angle degree variables;
determine at least one rod reversal event during the compressor operation cycle using at least one of the simulated cylinder pressure, the estimated valve opening event cylinder pressure, and the determined valve closing event cylinder pressure, wherein the at least one rod reversal event includes at least a first rod reversal event that occurs with the crank angle at about 40 degrees and at least a second rod reversal event;

diagnose a valve leak condition during the compressor operation cycle at the at least one valve closing event;

analyze an acceleration waveform sample to establish a first compressor operation cycle segment wherein the at least one valve is closed and a second compressor operation cycle segment wherein the at least one valve is closed;

set an acceleration baseline level for each of the first compressor operation cycle segment and the second compressor operation cycle segment using the simulated cylinder pressure;

determine a maximum value and a minimum value of the acceleration waveform sample for each of the first compressor operation cycle segment and the second compressor operation cycle segment; and diagnose a restricted flow condition during the compressor operation cycle at the valve opening event by comparing the maximum and minimum values of the acceleration waveform sample against the acceleration baseline level.

16. A computer program in accordance with claim 15 further configured to:

collect data by generating a crank angle degree variable and incrementally increasing the crank angle degree variable during each of a plurality of rule processing cycles to establish a compressor operation cycle;

plot a pressure measured within the first chamber and a pressure measured within the second chamber during the compressor operation cycle as a function of the crank angle; and plot a gas load and an inertial load measured within at least one of the first chamber and the second chamber during the compressor operation cycle as a function of the crank angle.

17. A computer program in accordance with claim 16 further configured to calculate a combined load including the measured gas load and the measured inertial load to determine the rod reversal event.

18. A computer program in accordance with claim 16 further configured to plot an acceleration waveform sample including a cylinder acceleration during the compressor operation cycle as a function of the crank angle.

19. A computer program in accordance with claim 16 further configured to:

generate a "Severity 1 Valve Leak Event" indication when a valve leak condition is detected; and generate a "Severity 1 Restricted Flow Event" indication when a restricted flow condition is detected.

* * * * *